United States Patent [19]

Usui

[11] Patent Number: 5,738,833
[45] Date of Patent: Apr. 14, 1998

[54] UNIT-TYPE METALLIC SUPPORT

[75] Inventor: Masayoshi Usui, Shizuoka, Japan

[73] Assignee: Usui Kokusai Sangyo Kaisha, Ltd., Shizuoka, Japan

[21] Appl. No.: 596,309

[22] PCT Filed: Sep. 8, 1994

[86] PCT No.: PCT/JP94/01483

§ 371 Date: Feb. 13, 1996

§ 102(e) Date: Feb. 13, 1996

[87] PCT Pub. No.: WO95/07141

PCT Pub. Date: Mar. 16, 1995

[30] Foreign Application Priority Data

Sep. 9, 1993 [JP] Japan .................... 5-247304

[51] Int. Cl.$^6$ ............................... B01D 53/34
[52] U.S. Cl. ............. 422/177; 422/170; 422/171; 422/180; 422/211; 422/222; 502/527
[58] Field of Search .................... 422/171, 177, 422/180, 211, 222, 170; 502/439, 527; 428/116, 593, 594; 29/890

[56] References Cited

U.S. PATENT DOCUMENTS

| 3,362,783 | 1/1968 | Leak | 422/180 |
|---|---|---|---|
| 4,282,186 | 8/1981 | Nonnenmann et al. | 422/180 |
| 4,843,815 | 7/1989 | Smojver | 422/180 |

FOREIGN PATENT DOCUMENTS 3154617  7/1991  Japan .

*Primary Examiner*—Hien Tran
*Attorney, Agent, or Firm*—Lowe, Price, LeBlanc & Becker

[57] ABSTRACT

A support is composed of a plurality of units which each consist of a hollow essentially cylindrical member in which a sets of parallel non-intersecting wires are strung. The units are arranged one after the other with the wires extending either parallel to each other or at different angles to one another. The cylindrical members are in some embodiments formed with crenelations over which wire wound during the stringing process. Alternatively, through-holes are used to receive portions of the wires.

20 Claims, 5 Drawing Sheets

UNIT-TYPE METALLIC SUPPORT

TECHNICAL FIELD

This invention generally relates to a metal support suitable for use in an exhaust gas cleaning system of an automotive vehicle for supporting an exhaust gas cleaning catalyst.

More specifically, this invention is concerned with an economical unit-type metallic support which is excellent in properties such as durability and which features, as constituent members of a metallic support, use of unit members (wire arrays)—which are each constructed of a wire frame having both a function as a casing and a wire-holding function and wires mounted on the wire frame—in place of conventional planar band(s) [sheet(s)] or corrugated band(s) [sheets] made of a costly heat-resistant steel.

BACKGROUND ART

Known catalyst supports of the above-described sort include two types, one being the ceramic-made monolithic type (ceramic monoliths) and the other the metal-made monolithic type (metallic monoliths).

Especially in recent days, a great deal of research and development work has been concentrated on metallic monoliths with a view of improving drawbacks encountered with ceramic monoliths, in other words, from the viewpoints of mechanical strength, durability, flow resistance, cleaning efficiency (the size reduction of a system) and the like.

Conventional metal-made catalyst supports of this type (metallic supports) (MS', metallic supports") are illustrated in FIG. 10 and FIG. 11. A metallic support of this type is constructed of a metal-made honeycomb structure H (hereinafter called a "metal-made honeycomb body" or simply a "honeycomb body") and a cylindrical metal-made casing 4 opening at opposite ends thereof and fixedly enclosing the honeycomb body H therein. In general, the honeycomb body has been fabricated by stacking a planar band 1, which is made of a steel sheet excellent in high-temperature oxidation resistance and heat resistance, and a corrugated band 2, which has been formed by corrugating a similar steel sheet, one over the other in a mutually contiguous relation and then rolling them together into a spiral form or by stacking such planar bands and corrugated bands into a multilayered form, so that the honeycomb body defines a number of network-patterned gas flow passages 3 (hereinafter called "cells") for permitting axial passage of exhaust gas therethrough.

Incidentally, FIG. 10 illustrates the rolled metallic honeycomb body H while FIG. 11 depicts the stacked metallic honeycomb body H.

The honeycomb body and the metal-made casing, which make up the above-described metallic support, are then firmly fixedly together by brazing or welding so that they can withstand thermal expansions and thermal stresses—which occur due to the high temperature of exhaust gas itself and an exothermic reaction of the exhaust gas by the cleaning catalyst (a catalyst formed of Pt, Pd, Rh and the like)—and also vibrations during running of the automotive vehicle. Needless to say, the planar band(s) and the corrugated band(s), which form the honeycomb body, are also fixed together at points or areas of contact therebetween by one of various methods.

As the planar band(s) 1 and the corrugated band(s) 2 in each of the above-described conventional honeycomb bodies, it is possible to use bands (sheets) having a thickness not greater than 0.1 mm and made of a material such as a heat-resistant stainless steel, e.g., chromium steel (chromium content: 13–25%) or Fe-20% Cr-5% Al, or a stainless steel formed by adding one or more rare earth metals to the former stainless steel to improve the high-temperature oxidation resistance. An Al-containing steel band is an extremely preferred material as each band, because it is equipped with improved high-temperature oxidation resistance and, when subjected to heat treatment, $\alpha\text{-Al}_2\text{O}_3$ is caused to deposit in various forms such as whisker and mushroom forms on its surfaces and serves to firmly hold a wash coat for carrying the exhaust gas cleaning catalyst.

The planar band(s) 1 and corrugated band(s) 2, which make up the metal-made honeycomb body H, are extremely costly because their material itself is expensive and a rolling cost is needed to form the material into sheets (thickness: 0.04–0.1 mm) suited for this kind of application. The use of such costly bands had reduced the price competitive power of the metal-made honeycomb body compared with ceramic-made honeycomb bodies. Further, an expensive high-temperature brazing material such as a Ni-base brazing material is used upon brazing the individual components in the fabrication of the metal-made honeycomb body as described above, resulting in a further cost increase. Disclosure of the Invention An object of the present invention is to avoid use of conventional expensive bands (sheets) for the fabrication of a metal-made honeycomb body and to construct a metallic support from unit members (wire arrays) each formed of a wire frame, which has both a function as a casing and a wire-holding function, and wires mounted on the wire frame.

It is therefore an object of the present invention to make it possible to construct a metallic support while achieving a cost merit by substituting the above-described unit members (wire arrays) for conventional expensive bands (sheets) and permitting design freedom with respect to the volumes of exhaust gas through various exhaust gas systems and the target degree of cleaning owing to its formation in units, and further to provide a metallic support having superior performance over conventional metal supports making use of bands (sheets).

Describing the present invention in brief, the present invention provides a unit-type metallic support for an exhaust gas cleaning catalyst, said support being constructed in combination of unit members $U_1$–$U_n$, n being an integer of 2 or greater, formed of at least two cylindrical wire frames $C_1$–$C_n$ made of a heat-resistant steel and metal wires W made of a heat-resistant steel and arranged on the individual frames, characterized in that the unit members $U_1$–$U_n$ feature:

(i) the individual cylindrical wire frames $C_1$–$C_n$, n being the integer of 2 or greater, as elements of the unit members $U_1$–$U_n$, are provided at outer peripheral walls thereof with holding portions $O_1$, $O_2$, ... $O_n$, respectively, for holding the associated metal wires W in parallel with each other in the individual cylindrical wire frames;

(ii) the holding portions are each formed of a desired number (m) of holding means $O_{11}$–$O_{1m}$, $O_{21}$–$O_{2m}$, ... or $O_{n1}$–$O_{nm}$ at a desired pitch (p); and (iii) the metal wires W are arranged on the holding means.

Figure 1:
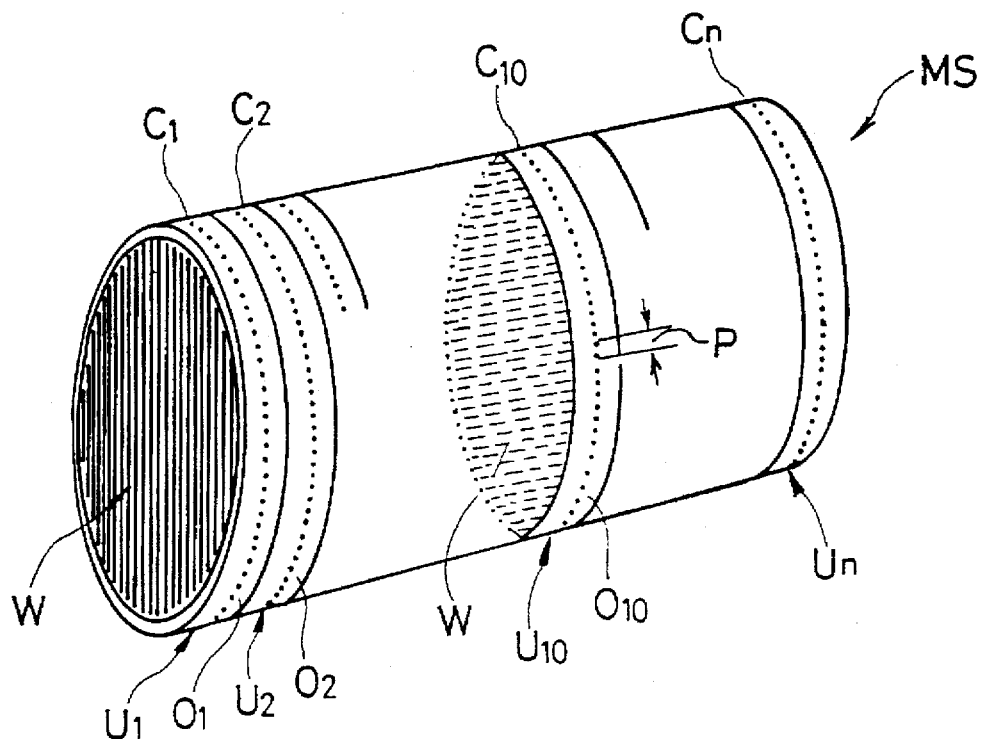
FIG. 1 is a perspective view of a unit-type metallic support according to the present invention, in which the unit-type metallic support is partly seen through and is partly omitted.

Incidentally, the symbols in the individual drawings have the following meanings:

| | |
|---|---|
| MS | Unit-type metallic support. |
| MS' | Conventional metallic honeycomb body. |
| $U_1, U_2, \ldots U_n$ | Unit members. |
| $C_1, C_2, \ldots C_n$ | Wire frames. |
| $O_1, O_2, \ldots O_n$ | Wire holding portions. |
| $O_{11}, O_{12}, \ldots O_{1m}$ | Wire holding means. |
| D | Width of the wire frames. |
| P | Pitch of the wire holding means. |
| $W_1, W_{11}, W_{12}, W_{13}$ | Metal wires. |

BEST MODE FOR CARRYING OUT THE INVENTION

The technical features and embodiments of the present invention will hereinafter be described with reference to the drawings.

Needless to say, it is to be borne in mind that the present invention is not limited to the embodiments illustrated in the drawings.

Figure 2:
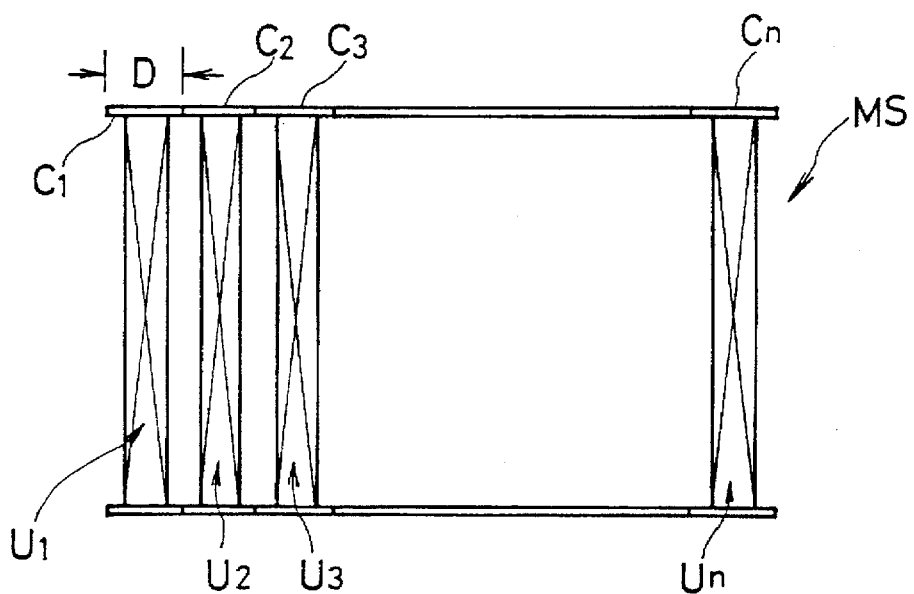
FIG. 2 is a cross-sectional view of the unit-type metallic support shown in FIG. 1, in which illustration of the unit-type metallic support is partly omitted.
Figure 3:
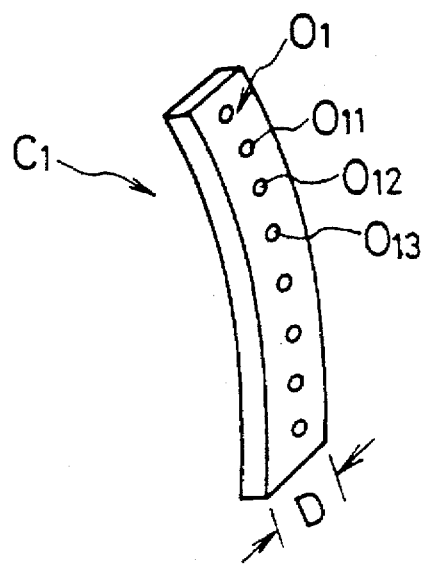
FIG. 3 is a fragmentary perspective view of a wire frame $C_1$ according to a first embodiment for a first unit $U_1$.

FIG. 1 through FIG. 3 illustrate the construction of the unit-type metallic carrier MS according to the first embodiment of the present invention.

FIG. 1 is the perspective view of the unit-type metallic support MS, in which the unit-type metallic support is partly seen through and is partly omitted, FIG. 2 is the cross-sectional view of the unit-type metallic support MS shown in FIG. 1, in which illustration of the unit-type metallic support is partly omitted, and FIG. 3 is the fragmentary perspective view of the wire frame $C_1$ as the element of the unit member $U_1$.

As is illustrated in the drawings, the unit-type 10 metallic support MS according to the present invention is constructed by using unit members $U_1, U_2, \ldots U_n$ as many as desired. Each unit member is constructed by arranging metal wires W made of a heat-resistant steel on each of plural cylindrical wire frames $C_1, C_2, \ldots, C_n$, n: an integer of 2 or greater) made of a heat-resistant steel and having both a wire-holding function and a function as a casing.

Described more specifically, the unit members $U_1, U_2, \ldots U_n$ in the present invention are constructed as will be described next.

(i) In the individual cylindrical wire frames $C_1, C_2, \ldots, C_n$ as elements of the unit members $U_1-U_n$, each cylindrical wire unit is provided on an outer peripheral wall thereof with a holding portion ($O_1, O_2 \ldots$ or $O_n$) for the associated metal wires W in parallel with each other in the individual cylindrical wire frames.

(ii) Further, the holding portions $O_1-O_n$ of the individual cylindrical wire frames $C_1-C_n$ are provided at intervals of a desired pitch (p) with a desired number (m) of holding means $O_{11}-O_{1m}$ for $O_1$, $O_{21}-O_{2m}$ for $O_2, \ldots O_{n1}-O_{nm}$ for $O_n$, respectively.

(iii) Next, the metal wires W are arranged on the holding means of the individual cylindrical wire frames $C_1-C_n$ constructed as described above, whereby the unit members $U_1-U_n$ are fabricated.

One example of the holding means formed at the holding portions of the individual wire frames $C_1-C_n$ is illustrated in FIG. 3.

The wire frame $C_1$ depicted in FIG. 3 is in the form of a cylindrical body. It is also shown that the metal wire holding portion $O_1$ is arranged along the outer peripheral wall and apertures $O_{11}, O_{12}, O_{13} \ldots O_{1m}$ as many as m are formed as holding means at the holding portion $O_1$ at a desired pitch (p) so as to hold the wires in a parallel, spaced, non-contact relationship in the manner illustrated in FIG. 1.

Incidentally, FIG. 3 depicts only a part of the cylindrical body.

Figure 4:
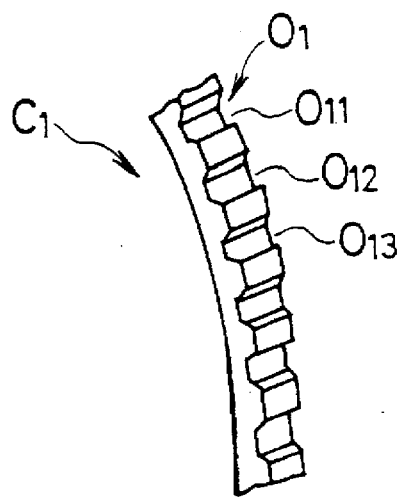
FIG. 4 is a fragmentary perspective view of a wire frame $C_1$ according to a second embodiment for a first unit $U_1$.
Figure 5:
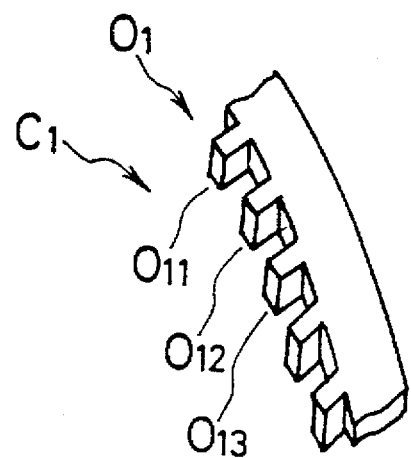
FIG. 5 is a fragmentary perspective view of a wire frame $C_1$ according to a third embodiment for a first unit $U_1$.
Figure 6:
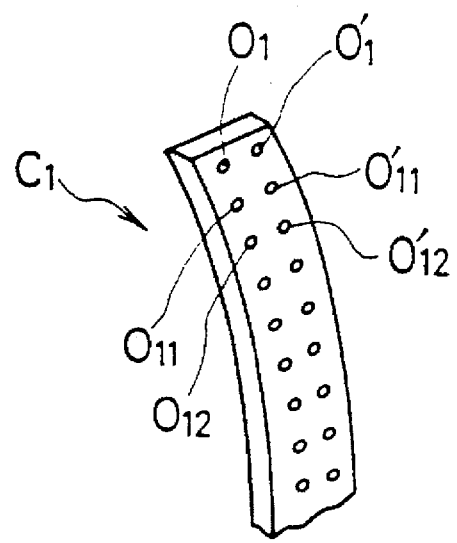
FIG. 6 is a fragmentary perspective view of a wire frame $C_1$ according to a fourth embodiment for a first unit $U_1$.

FIG. 4 through FIG. 6 illustrate the other embodiments of the wire frames $C_1-C_n$ applicable to the unit-type metallic support MS according to the present invention. Namely, the embodiments shown in FIG. 4 through FIG. 6 are modifications of the above-described embodiment which is depicted in FIG. 3.

FIG. 4 shows that the holding means formed at the holding portion $O_1$ of the cylindrical wire frame $C_1$ are recesses $O_{11}, O_{12}, O_{13} \ldots O_{1m}$ formed as many as m in the outer peripheral wall of the cylindrical body.

FIG. 5 illustrates that the holding means formed at the holding portion $O_1$ of the cylindrical wire frame $C_1$ are serrations $O_{11}, O_{12}, O_{13} \ldots O_{1m}$ formed as many as m at a front side of the outer peripheral wall of the cylindrical body.

FIG. 6 depicts that in the cylindrical wire frame $C_1$, the holding means formed as two rows of holding portions $O_1$, $O_1'$ provided in parallel with each other on the cylindrical outer peripheral wall are apertures $O_{11}, O_{12}, \ldots O_{1m}$; $O'_{11}, O'_{12}, \ldots O'_{1m}$ formed as many as m.

Figure 7:
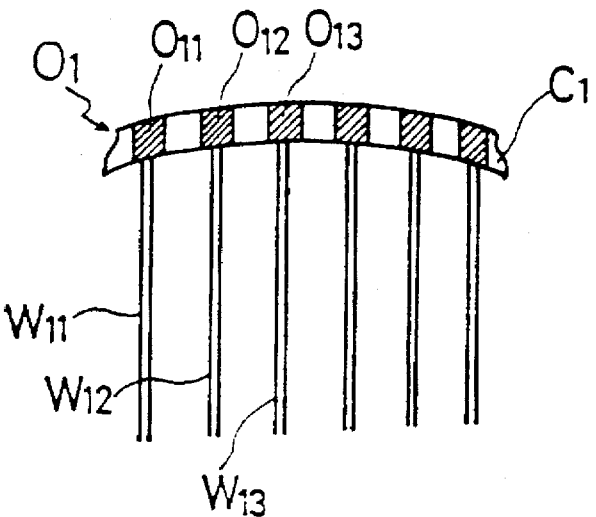
FIG. 7 is a schematic illustration showing the manner of arrangement and securement of metal wires to the wire frame $C_1$ for the first unit $U_1$ wherein the wires are spaced at a predetermined pitch and are parallel so as to be non-intersective and in a non-contact relationship with one another.
Figure 8:
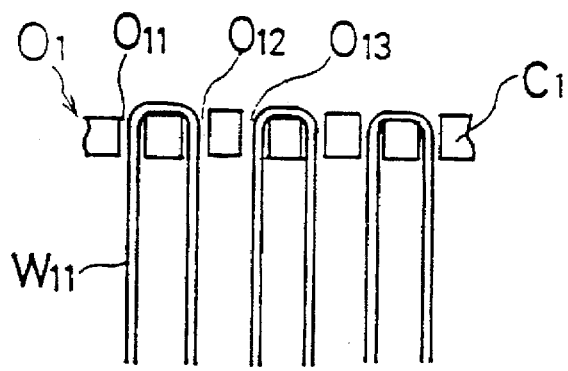
FIG. 8 is a schematic illustration depicting the manner of arrangement of metal wires to the wire frame $C_1$ for the first unit $U_1$.
Figure 9:
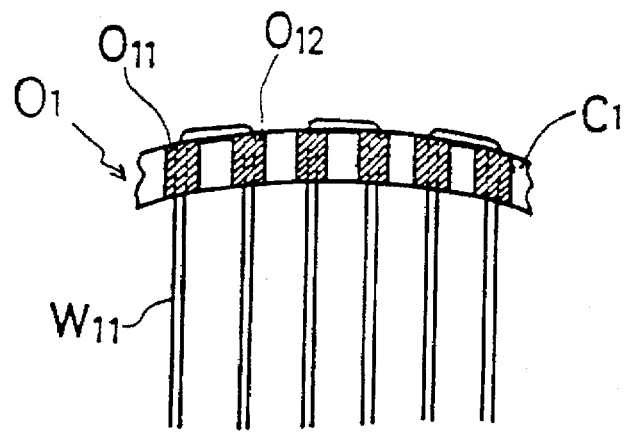
FIG. 9 is a schematic illustration showing the manner of securement in the wire array illustrated in FIG. 8.

In the above-described individual unit members $U_1, U_2, \ldots U_n$ in the present invention, the manner of arrangement and securement of the metal wires W are shown in FIG. 7 through FIG. 9.

FIG. 7 through FIG. 9 show manners of arrangement and securement of the metal wires W on the first wire frame $C_1$ of the first unit member $U_1$.

As shown in to FIG. 7, plural wires $W_{11}, W_{12}, W_{13} \ldots$ are individually arranged in a taut parallel, spaced (at pitch (p)), non-contact relationship between opposing ones of the apertures $O_{11}-O_{1m}$ formed as many as m at the desired pitch (p) in the holding portion $O_1$ of the first wire frame $C_1$, and are secured by welding at the apertures and their adjacent positions.

According to FIG. 8 to FIG. 9, a single line of wire $W_{11}$ is successively arranged taut in a zig-zag pattern between opposing ones of the apertures $O_{11}$–$O_{1m}$ formed as many as m at the desired spacing or pitch (p) in the holding portion $O_1$ of the first wire frame $C_1$ (FIG. 8) so as to be parallel, and are secured in their non-contact, parallel state by brazing at the apertures and their adjacent positions (FIG. 9).

The structures of the individual unit members $U_1$–$U_n$ the present invention are designed, for example, so that the whole unit U (=$U_1$+$U_2$+ ... $U_n$) can achieve exhaust gas cleaning ability of substantially the same level as the conventional rolled or stacked metallic honeycomb body MS' formed of planar band(s) and corrugated band(s) and illustrated in FIG. 10 or FIG. 11. The number of the metal wires W to be arranged taut, the width (D) of the wire frames, and the intervals of the wire holding portions $O_1$, $O_2$, ... $O_n$ (including the case that holding portions are provided in plural rows in the same wire frame) can be determined as needed for the design.

In relation to the conventional rolled or stacked metallic honeycomb body MS' described above, the following numerical values may be used as references.

To achieve, for example, cleaning ability equivalent to that of a cylindrical rolled metallic honeycomb body of 60.5 mm in diameter and 75 mm in length, it is necessary to have a similar supporting surface area for an exhaust gas cleaning catalyst.

Assuming that the metallic support according to the present invention is in a square form of 53.6 mm per side with an inter-wire interval of 1.0 mm (p=d=1.0 mm), the metallic support is simply calculated to have 100 stages when the metal wires have a diameter of 0.2 mm (n=100, total wire length=290 m) or to have 60 stages when the metal wires have a diameter of 0.3 mm (n=68, total wire length= 195 m).

Figure 10:
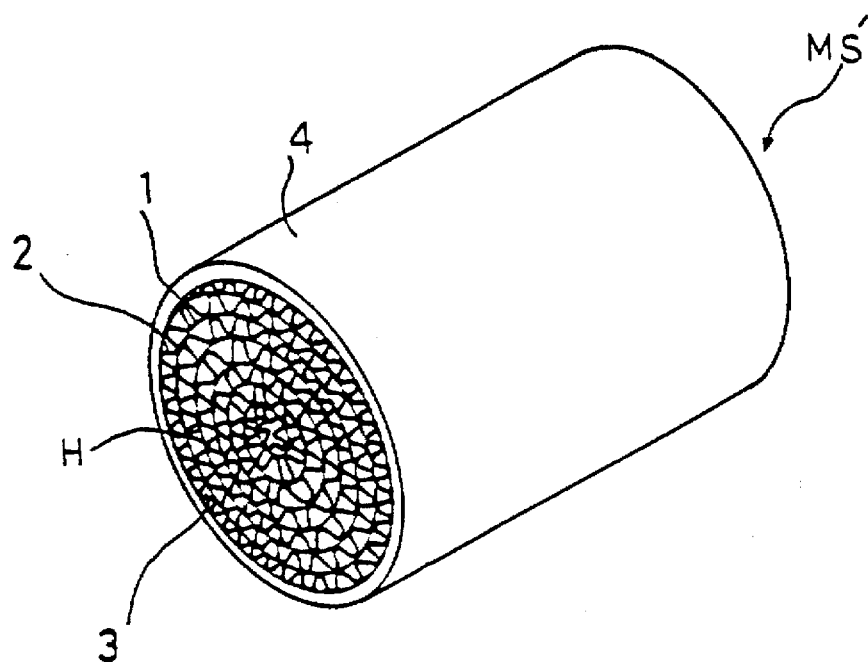
FIG. 10 is a perspective view of a conventional rolled metallic honeycomb body.
Figure 11:
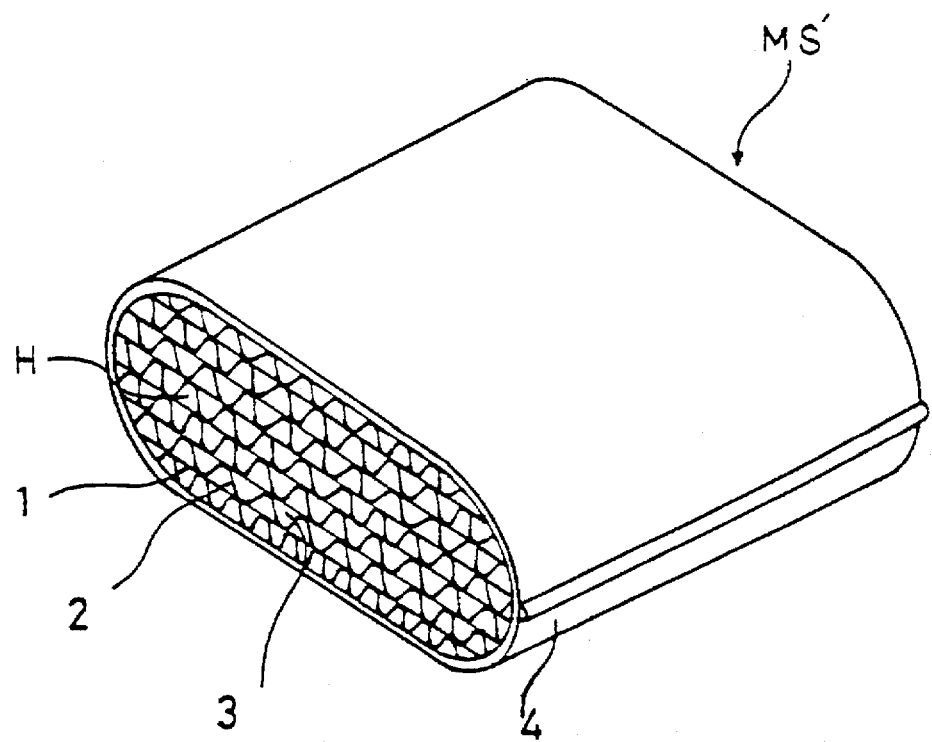
FIG. 11 is a perspective view of a conventional stacked metallic honeycomb body.

As the material of the wire frames $C_1$–$C_n$ in the unit-type metallic support MS according to the present invention, a heat-resistant steel similar to that employed for the fabrication of the conventional metallic honeycomb bodies shown in FIGS. 10–11 can be used. Also usable is a steel having high heat resistance and corrosion resistance.

It is also possible to use a material of a double layer structure in which the metal material of the outer layer is higher in heat resistance and corrosion resistance than that of the inner layer, specifically, a double-layer material making use of a ferrite stainless steel as the inner layer and an austenite stainless steel as the outer layer.

Preferred as the material of the metal wires W in the unit-type metallic support MS according to the present invention is a material having similar properties as the planar band(s) [sheet(s)] or corrugated band(s) [sheet(s)] used for the fabrication of the conventional metallic honeycomb bodies shown in FIGS. 10–11, namely, a material excellent in high-temperature oxidation resistance. For example, a wire material such as Fe-20Cr-5Al or an alloy obtained by adding one or more rare earth metals to it is used.

Further, the diameter of the metal wires W can be similar to the thickness of the bands (sheets). For example, metal wires of 0.1–1.0 mm are used generally. In this case, it is not absolutely necessary to use metal wires of the same diameter. For example, metal wires of a large diameter and those of a small diameter may be alternately used.

The cross-sectional shape of the wires is generally circular. They may however have a non-circular cross-sectional shape such as an oval, polygonal or rectangular cross-sectional shape. As a further alternative, they may be twisted or may be used in combination. As a still further alternative, flattened ribbon wires can also be used.

The shape of the unit-type metallic support MS according to the present invention as seen in a front view is not limited to the circular shape shown in FIG. 1 but can take any desired shape conforming with the shape of a place of application, for example, of a space underneath of a vehicle body, such as a rectangular, square, oval or triangle shape. In accordance with a shape as seen in a front view, the metal wires W are arranged.

A second embodiment of the unit-type metallic support MS according to the present invention is also shown by dotted lines in FIG. 1.

Namely, the second embodiment of the present invention is characterized in that the directions of extension of metal wires W arranged taut in the individual unit members $U_1$–$U_n$ are different as diffient from the same direction or parallel arrangement of the the first embodiment.

In FIG. 1, the above-mentioned feature is indicated by the fact that the metal wires W in the first unit $U_1$ and the metal wires W in the 10th unit $U_{10}$ extend at right angles.

When the metal wires W arranged taut in the wire frames in the 1st row to the nth row, namely, in the individual unit members $U_1$–$U_n$ extend in different directions, for example, extend at right angles relative to each other, a stream of exhaust gas hits the wire materials within the metallic support so that the exhaust gas is agitated and rendered turbulent. Accordingly, the catalytic reaction between the exhaust gas cleaning catalyst supported on the surfaces of the metal wires W and the exhaust gas is made efficient so that the unit-type metallic support according to the second embodiment has excellent exhaust gas cleaning ability.

Where the cleaning ability can be set low in view of the cleaning ability of exhaust gas, namely, the intervals between the individual unit members $U_1$–$U_n$ can be widened in the present invention, it is obviously possible to form a metallic support by inserting spacers between the individual unit members. Needless to say, the spacers are components of the unit members.

ADVANTAGES OF THE INVENTION

Compared with the conventional metallic honeycomb bodies having various types of honeycomb structures formed of planar band(s) [sheet(s)] and corrugated band(s) [sheet(s)], the unit-type metallic support MS according to the present invention for supporting an exhaust gas cleaning catalyst exhibits the following excellent advantages because the unit-type metallic support has been fabricated using wire arrays of wire frames as a unit and metal wires arranged thereon while avoiding the use of such bands (sheets):

(i) As the present invention has adopted the unit members (wire arrays) instead of the conventional planar band(s) or corrugated band(s) [sheet(s)], deforming force which is developed based on large thermal stress applied during use of the honeycomb body can be effectively absorbed and reduced by the individual wires. The metallic support is excellent in durability.

(ii) Owing to the adoption of the unit members (wire arrays) in the present invention instead of the conventional bands (sheets), exhaust gas can be made turbulent between the individual wires, thereby improving the efficiency of contact between the exhaust gas and the supported catalyst and hence enhancing the cleaning ability.

(iii) Although the conventional bands (sheets) are extremely costly, the unit members (wire arrays) in the present invention are economical so that a cost merit can be obtained.

(iv) Since the metallic support is constructed of the unit members (wire arrays), the metallic support can be constructed with design freedom with respect to the volume of exhaust gas in an exhaust gas system and/or a target degree of cleaning.

CAPABILITY OF EXPLOITATION IN INDUSTRY

Compared with the conventional metallic supports composed, as principal elements, of the metallic honeycomb bodies formed of the planar and corrugated bands (sheets), the unit-type metallic support according to the present invention is superior in durability, cleaning ability, economy and the like owing to the use of the wire arrays as unit members.

Accordingly, the unit-type metallic support according to the present invention can be suitably used in an exhaust gas cleaning device.

I claim:

1. A unit-type metallic support for an exhaust gas cleaning catalyst, said support comprising:
   a plurality of unit members each formed of:
      a cylindrical wire frame made of a heat-resistant steel, and
      a plurality of spaced, parallel, non-intersecting metal wires made of a heat-resistant steel arranged on the frame;
      said cylindrical wire frame being provided at outer peripheral wall thereof with a plurality of holding means which are arranged at a predetermined pitch for holding the metal wires parallel with each other in the spaced non-contacting relationship in said cylindrical wire frame; and
      a catalyst on the surface of the metal wires.

2. A unit-type metallic support according to claim 1, wherein the holding means are apertures, recesses or serration.

3. A unit-type metallic support according to claim 1, wherein the holding means for holding the metal wires on the outer peripheral wall thereof comprises apertures formed in a row at the predetermined pitch.

4. A unit-type metallic support according to claim 1, wherein the holding means for holding the metal wires on the outer peripheral wall thereof comprises apertures formed in two rows, which are parallel with each other, at the predetermined pitch.

5. A unit-type metallic support according to claim 1, wherein the directions of extension of the metal wires arranged on the holding means in the plurality of unit member are the same.

6. A unit-type metallic support according to claim 1, wherein the direction of extension of the metal wires arranged on the holding means in each unit member is different from the direction of extension of the metal wires arranged on the holding means of other unit members.

7. A unit-type metallic support according to claim 1, wherein the metal wires are secured at the holding means in adjacent positions in the wire frame.

8. A unit-type metallic support according to claim 7, wherein the metal wires are secured by brazing or welding.

9. A metallic support comprising:
   a plurality of cylindrical members arranged coaxially with respect to each other;
   a plurality of sets of wires, each set being strung on an cylindrical member in a manner wherein the wires of each set extend across the cylindrical member in a parallel, spaced, non-contact relationship with one another; and wherein each of the cylindrical members is arranged so that the set of wires in one cylindrical member have a predetermined spatial relationship with the set of wires in an adjacent cylindrical member.

10. A metallic support according to claim 9, wherein the sets of wire have a catalyst on the surface thereof.

11. A metallic support according to claim 9, wherein the predetermined spatial relationship is one wherein the wires of each set of wires are essentially parallel with the wires of other sets.

12. A metallic support according to claim 9, wherein the predetermined spatial relationship is one wherein the wires of each set of wires are non-parallel with the wires of other sets.

13. A metallic support according to claim 9, wherein each cylindrical member is formed with a plurality of crenulation portions between which the wires of each set of wires pass.

14. A metallic support according to claim 9, wherein each cylindrical member is formed with a plurality of openings through which portions of each set of wires are strung.

15. A metallic support comprising:
   a first cylindrical member having a leading edge and a trailing edge, the first cylindrical member being formed with a plurality of equidistantly spaced first openings in a first outer peripheral wall thereof;
   a first wire which is strung through the spaced first openings in a manner to form a plurality of first wire sections which span across a mouth of the first cylindrical member in a manner wherein each of said first lens wire sections is in a parallel, spaced and non-contact relationship with one another;
   a second cylindrical member having a leading edge and a trailing edge, the second cylindrical member being formed with a plurality of equidistantly spaced second openings in a second outer peripheral wall;
   a second wire which is strung through the spaced second openings in a manner to form second wire sections which span across a mouth of the second cylindrical member in a manner wherein each of said second wire sections is in a parallel, spaced and non-contact relationship with one another, said second cylindrical member being arranged with the first cylindrical member so that the leading edge of the second cylindrical member is in abutment with the trailing edge of the first cylindrical member and so that the first wire sections of the first wire have a predetermined spatial relationship with the second wire sections of the second wire.

16. A metallic support according to claim 15, wherein the first wire and the second wire have a catalyst on the surface thereof.

17. A metallic support according to claim 15, wherein the first wire sections of the first wire are arranged in an essentially parallel relationship with the second wire sections of the second wire.

18. A metallic support according to claim 15, wherein the first wire sections of the first wire are arranged in a non-parallel relationship with the second wire sections of the second wire.

19. A metallic support according to claim 15, wherein the first and second openings in the respective first and second cylindrical members are defined between first and second sets of crenulations, respectively, and wherein the first and second wires are respectively wound over the first and second sets of crenulations.

20. A metallic support according to claim 15, wherein the first and second openings in the respective first and second cylindrical members are defined by first and second pluralities of through holes which are formed through the first and second outer periphery walls of the first and second cylindrical members respectively.

* * * * *